United States Patent
Bolte et al.

[11] Patent Number: 5,955,813
[45] Date of Patent: *Sep. 21, 1999

[54] ELECTRIC MOTOR

[75] Inventors: Ekkehard Bolte; Anton Hammers, both of Aachen; Klaus Stips, Würselen, all of Germany

[73] Assignee: U.S. Philips Corporation, New York, N.Y.

[*] Notice: This patent is subject to a terminal disclaimer.

[21] Appl. No.: 08/488,324

[22] Filed: Jun. 7, 1995

[30] Foreign Application Priority Data

Jun. 10, 1994 [DE] Germany .................. P 44 20 371

[51] Int. Cl.⁶ .................. H02K 5/16; H02K 21/22; H02K 7/14
[52] U.S. Cl. .................. 310/254; 310/67 R
[58] Field of Search .................. 310/67 R, 180, 310/254, DIG. 6, 45

[56] References Cited

U.S. PATENT DOCUMENTS

| | | | |
|---|---|---|---|
| 4,384,386 | 5/1983 | Dorner et al. | 310/67 R |
| 4,645,961 | 2/1987 | Malsky | 310/254 |
| 4,658,162 | 4/1987 | Koyama et al. | 310/254 |
| 4,665,331 | 5/1987 | Sudo et al. | 310/68 |
| 4,685,014 | 8/1987 | Hanazono et al. | 29/603 |
| 4,763,053 | 8/1988 | Rabe | 310/180 |
| 5,012,571 | 5/1991 | Fujita et al. | 29/598 |
| 5,268,602 | 12/1993 | Schwaller | 310/67 A |
| 5,304,884 | 4/1994 | Kitajima et al. | 310/198 |
| 5,472,546 | 12/1995 | Thaler | 29/831 |
| 5,493,074 | 2/1996 | Murata et al. | 174/254 |
| 5,714,828 | 2/1998 | Ackermann et al. | 310/254 |

FOREIGN PATENT DOCUMENTS

| | | |
|---|---|---|
| 0410293 | 9/1993 | European Pat. Off. . |
| 682780 | 11/1993 | Switzerland . |

*Primary Examiner*—Clayton LaBalle
*Attorney, Agent, or Firm*—Edward Blocker

[57] ABSTRACT

In an electric motor with a stationary and a movable active motor part, one of the two active motor parts comprising a motor winding and the other a motor magnet, an air gap being formed between said active motor parts. The motor winding (9) is built up on a synthetic resin carrier foil and is formed through local removal of copper material with which the synthetic resin foil (23) had previously been fully coated. The synthetic resin carrier foil (23) and the planar coils (28) adhering thereto are provided with an adhesive filler material (30) such that the adhesive filler material (30) fills up the gaps (26) formed between the individual conductor tracks through the removal of the copper material. The assembly thus stabilized is wound into an evenly rounded cylinder.

8 Claims, 5 Drawing Sheets

ELECTRIC MOTOR

BACKGROUND OF THE INVENTION

The invention relates to an electric motor with a stationary and a movable active motor part, one of the two active motor parts comprising a motor winding and the other a motor magnet, an air gap being formed between said active motor parts, while the motor winding is built up on a synthetic resin carrier foil and is formed through local removal of copper material with which the synthetic resin foil had previously been fully coated.

The invention further relates to a hard disk drive provided with said electric motor.

EP 410 293 B1 discloses an electric motor in which a permanent magnetic hollow cylinder is arranged on a central shaft fixedly connected to a rotatable hub. The permanent magnetic hollow cylinder is surrounded by a metal plating stator which is arranged on a stationary base part. The stator has a coil winding inserted into slots of the stack of iron laminations. The bearing of the hub is provided radially and axially by means of hydrodynamic bearings.

The interaction between the slotted stator and the multipole magnetized permanent magnets causes so-called detent torques. These are moments of torque which change periodically with the disk rotation, whose average value is zero, and which accordingly do not contribute to the nominal torque. The retentive moments cause acoustic noises, mechanical vibrations, and rotation speed fluctuations; in addition, they increase the required initial torque, which is a critical quantity particularly for hard disk drives.

The manufacture of planar motor windings is known, whereby copper tracks provided on synthetic resin foils are so etched that only planar coil windings remain. Such motor windings are capable of perfect operation and present no problems as long as the foils are not bent.

Problems do arise, however, when such a winding is shaped into a cylinder. Then the otherwise simple technology leads to short-circuits between the conductor tracks. In addition, such windings cannot be made sufficiently round. This means that unnecessarily wide air gaps must be created. The exact motor rotation is impaired thereby. These problems arise especially in small motors which are used for hard disk drives.

SUMMARY OF THE INVENTION

It is an object of the invention to provide an electric motor of the kind mentioned in the opening paragraph which operates with narrow tolerances in the air gap and in its bearings, so as to achieve a good constant speed with an improved efficiency.

According to the invention, this object is achieved in that
the synthetic resin carrier foil and the planar coils adhering thereto are provided with an adhesive filler material such that the adhesive filler material fills up gaps formed between the individual conductor tracks through the removal of the copper material, and
the assembly thus stabilized is wound into an evenly rounded cylinder.

Such a motor has a winding which is accurately and evenly rounded and which renders possible small air gaps and an exact support of the hub. The result is that the packing density of the hard disks can be increased with such a motor being used for a hard disk drive.

Such a motor winding can be made sufficiently round. There will be no short-circuits between individual turns.

In a further embodiment of the invention, the adhesive filler material filling the gaps has a stability such that the planar conductor tracks of the coils are interconnected thereby with a dimensional stability as if said gaps were still filled with the removed copper. An etched foil will behave like a non-etched foil as a result of this trick. Since a non-etched foil can be wound into a perfectly round shape, this is also true for the prepared foil according to the invention.

In a further embodiment of the invention, a polymerizing glue is used as the adhesive filler material.

In a further embodiment of the invention, the adhesive filler material is provided by means of silk-screen printing or roller coating.

It is another object of the invention to provide a hard disk drive according to the invention with improved characteristics. This object is achieved by providing a hard disk drive with an electric motor with a stationary and a movable active motor part, one of the two active motor parts comprising a motor winding and the other a motor magnet, an air gap being formed between said active motor parts, while the motor winding is built up on a synthetic resin carrier foil and is formed through local removal of copper material with which the synthetic resin foil had previously been fully coated, the synthetic resin carrier foil and the planar coils adhering thereto being provided with an adhesive filler material such that the adhesive filler material fills up gaps formed between the individual conductor tracks through the removal of the copper material, and the assembly thus stabilized being wound into an evenly rounded cylinder.

BRIEF DESCRIPTION OF THE DRAWINGS

The invention will be explained in more detail with reference to the drawing, in which.

DETAILED DESCRIPTION OF THE PREFERRED EMBODIMENT

Figure 1A:
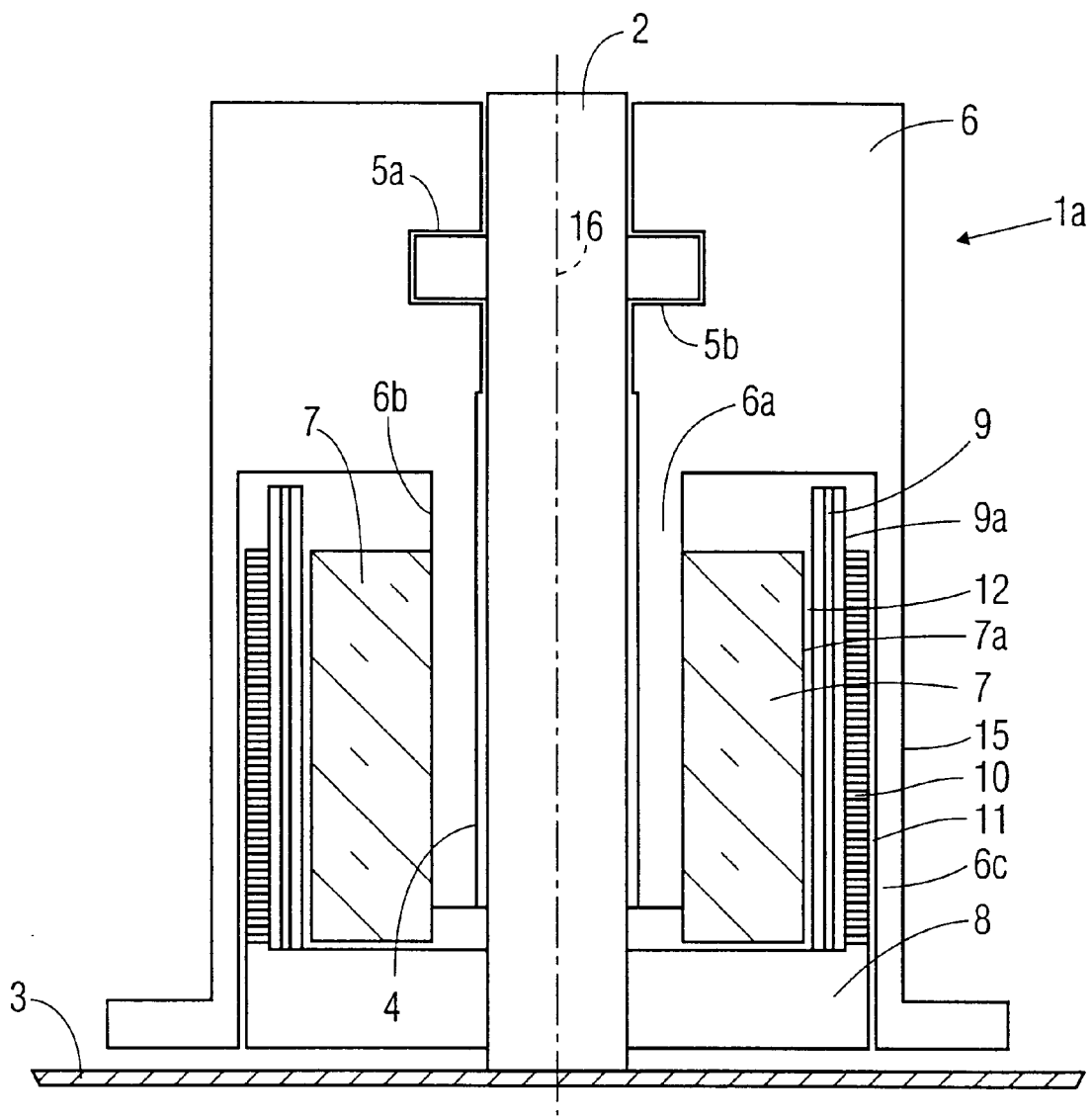
FIG. 1a shows a spindle motor for a hard disk drive with a non-ferrous coil configuration and a jacket-type soft magnetic yoke surrounding the coil configuration and fixedly connected to the coil configuration.

FIG. 1a shows in cross-section a spindle motor 1a which is used in particular as a drive motor for hard disks in data processing appliances. A motor shaft 2 of this spindle motor 1a is fixedly connected to a plate 3 of a hard disk housing (not shown). Two hydrodynamic axial bearings 5a and 5b support a hub 6 around the motor shaft 2 in the shaft portion remote from the plate 3. A further hydrodynamic spiral bearing 4 is present close to a support plate 8. The hub 6 journalled on the motor shaft 2 with rotation possibility has an inner hub portion 6a which surrounds the motor shaft 2 and on whose outside 6b is fastened a permanent magnetic rotor magnet 7. The field generated by the rotor magnet 7 and present at its outside 7a is perpendicular to the axis of rotation 16. A support plate 8 is arranged on the motor shaft 2. This plate carries on its outside a coil configuration 9 which belongs to the motor stator and which is yet to be described below, and a yoke 10 which is also to be described below. The hub 6 further comprises an outer hub portion 6c which with its bell shape surrounds the yoke 10.

The coil configuration 9 comprises a bent foil winding which is described further below. The support plate 8 in this motor construction supports the jacket-type yoke 10 of soft magnetic material on the outside 9a of the coil configuration 9. In this construction, two air gaps 11 and 12 are formed, of which the one air gap 11 separates the yoke 10 from the hub 6 and the other air gap 12 separates the rotor magnet 7 from the coil configuration 9.

Figure 1B:
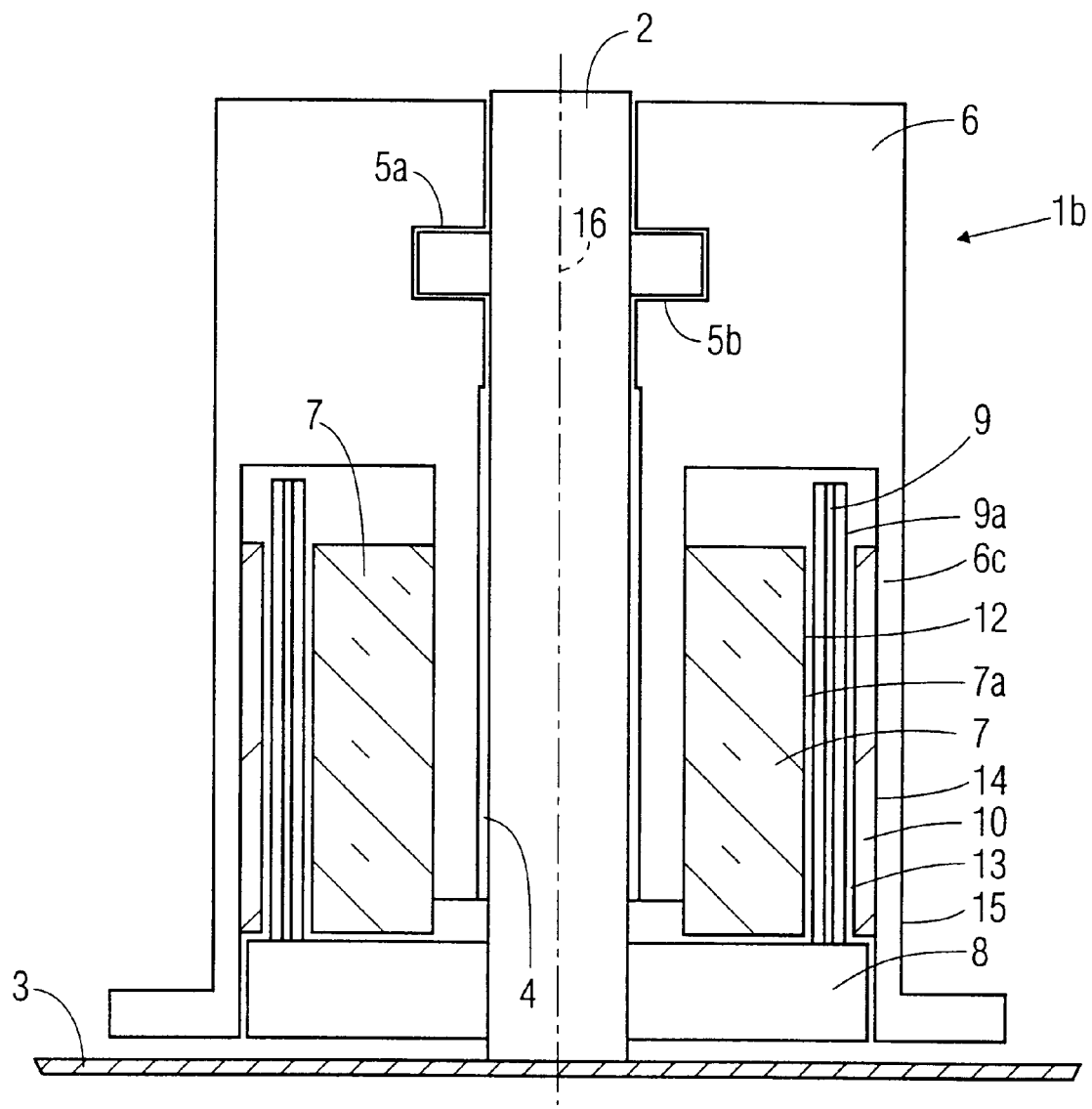
FIG. 1b shows a modification of the spindle motor of FIG. 1a, in which the yoke is connected to the hub.
Figure 2A:
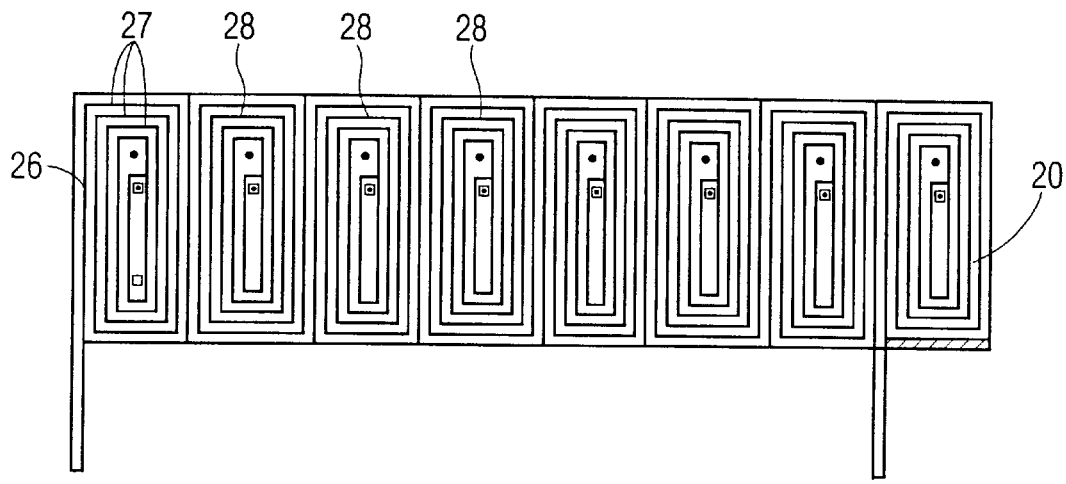
FIG. 2 shows a foil with planar coil windings.
Figure 2B:
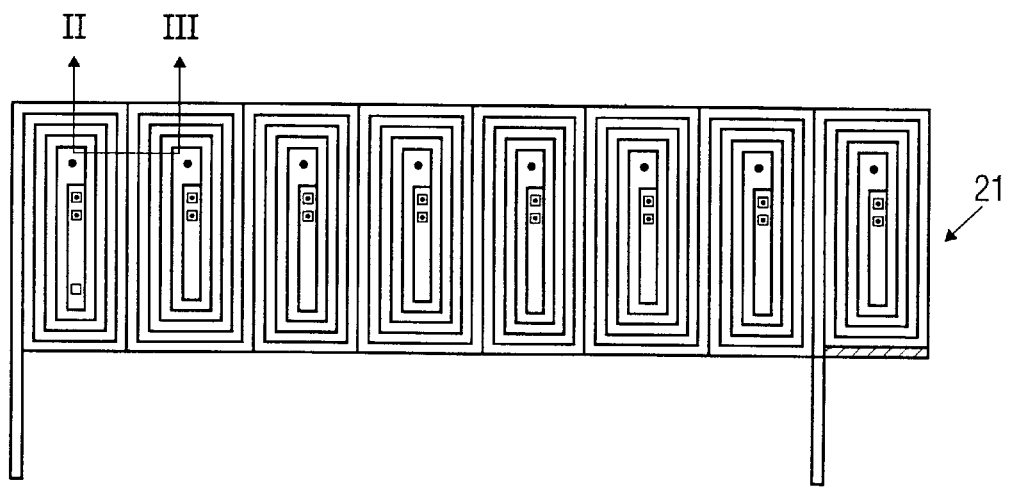
Figure 2C:
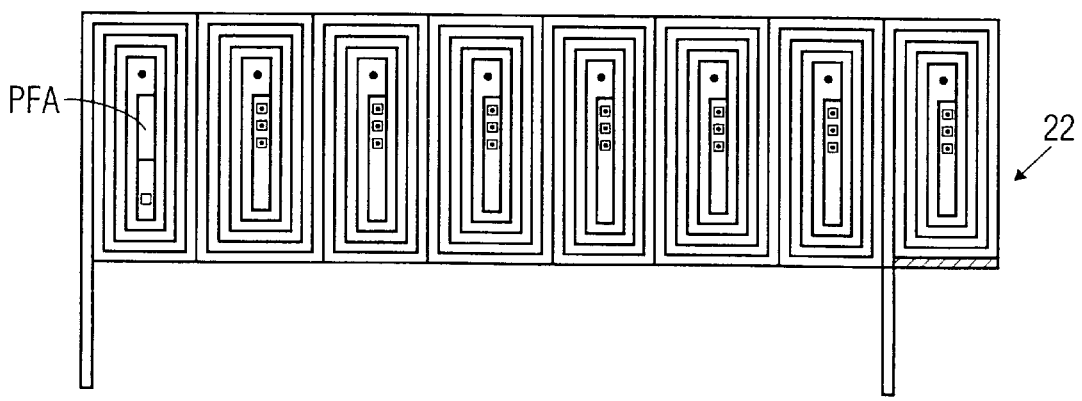

FIG. 1b shows in cross-section a spindle motor 1b in a modified arrangement. The spindle motor of FIG. 2 corresponds to the spindle motor 1a of FIG. 1 in many respects. Corresponding parts have been given the same reference numerals. The motor shaft 2 of the spindle motor 1b of FIG. 2 is fixedly connected to the plate 3 of the hard disk housing (not shown). Two hydrodynamic axial bearings 5a and 5b support the hub 6 at the portion of the motor shaft 2 remote from the plate 3. A further hydrodynamic spiral bearing 4 is present close to a support plate 8. A permanent magnetic rotor magnet 7 is fastened on the hub 6.

The support plate 8 is provided at the motor shaft 2 and supports the coil configuration 9 which consists of a bent foil winding and will be described further below. The outside 9a of the coil configuration 9 adjoins an air gap 13. The air gap 13 is bounded on the outside by a jacket-type yoke 10 of soft magnetic material. This yoke 10 is fixedly arranged at the inside 14 of the hub 6, which also has a jacket shape. In this construction, accordingly, there are again two air gaps: the air gaps 12 and 13, of which the one air gap 13 separates the yoke 10 from the coil configuration 9 and the other air gap 12 separates the rotor magnet 7 from the coil configuration 9.

The outer hub portion 6c provides space for the mounting of one or several hard disks.

Figure 3:
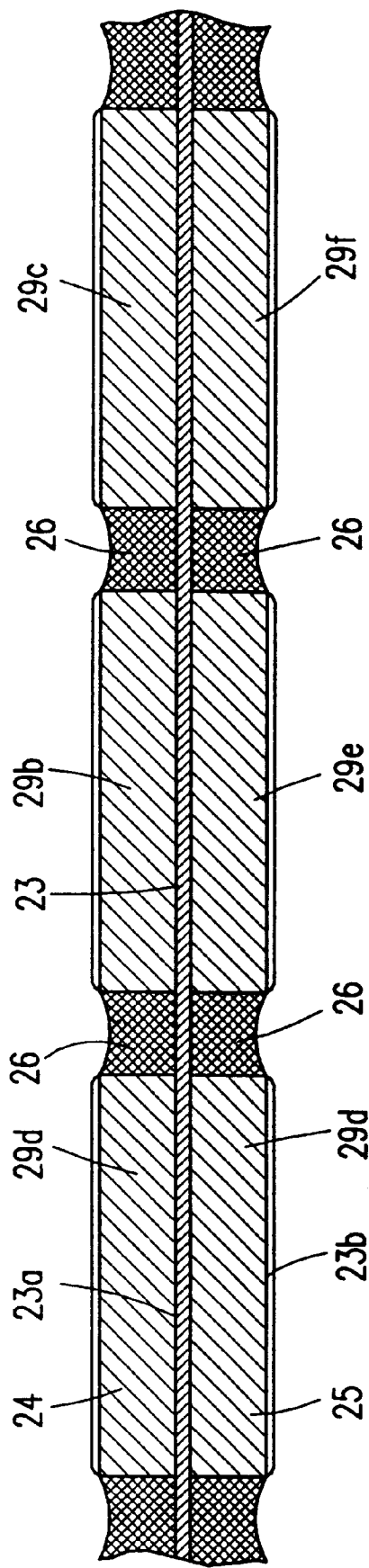
FIG. 3 is a cross-section of part of a foil with deposited copper windings taken on the line III—III in FIG. 2.

FIG. 2 shows in plan view three foil windings 20, 21, 22. These three foils are to be rolled so as to form a three-phase winding for the hard disk motor. The rolled state is shown in perspective view in FIG. 4. Each single foil comprises, as FIG. 3 shows, a central synthetic resin foil 23 on whose two surfaces 23a and 23b copper foils 24 and 25 have been provided. The copper foils 24 and 25 were so etched in a generally known etching treatment that gaps 26 are created which separate individual copper conductor tracks 27 from one another, as is visible in FIG. 2. Planar coil windings 28 were thus formed on the foil 23 on both sides, which serve for motor excitation. The coils of the two foil sides are electrically interconnected from the upper to the lower side.

Figure 4:
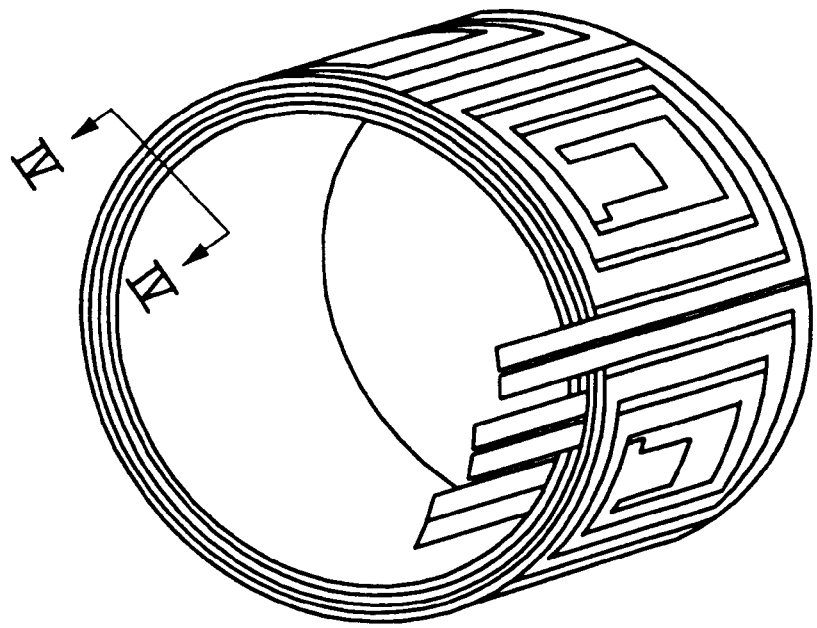
FIG. 4 shows the cylindrically bent winding, consisting of three winding strips from FIG. 2, in perspective view.
Figure 5:
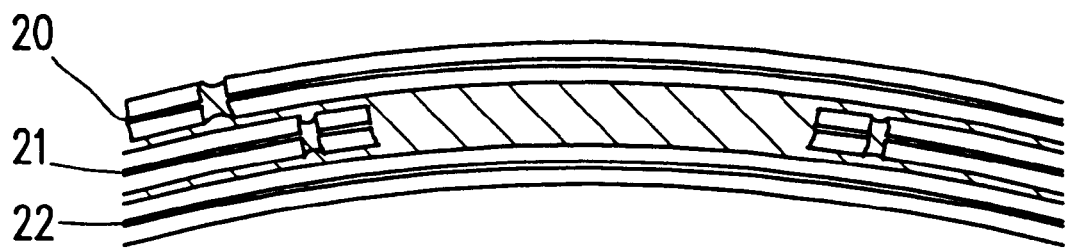
FIG. 5 shows a cut-out section from the curved winding demonstrating its absolute roundness.

In a silk-screen printing or roller coating process, the gaps 26 are filled up with an adhesive filler material. The adhesive filler material is a polymerizing glue. The glue has the property that it connects the planar conductor track portions 29a, 29b, 29c, 29d, 29e, 29f in a manner so stable that the planar conductor tracks 29 of the coil are interconnected again thereby with a dimensional stability as if the gaps 26 were still filled with the removed copper. Without etching, the copper would have allowed itself to be shaped into a perfectly round shape in the continuous state. Thanks to the filling of the gaps 26 with the adhesive filler glue, this is again achieved. FIG. 4 shows in perspective view how the three foil windings 20, 21, 22 are rolled up into a three-phase winding in a perfectly round shape. For a clearer view, FIG. 5 shows a cross-section in which the perfect curvatures of the foils 20, 21 and 22 are shown even better.

The perfect curvature renders it possible to keep the air gap of the motor small. Furthermore, a very good radial support is achieved by the construction of the hydrodynamic axial bearings 5a and 5b and hydrodynamic spiral bearing 4. The perfectly wound winding and the use of the spiral groove bearings minimize the radial bearing forces generated by the motor, and thus the deviation of the rotor axis. The result of this is that the motor has a longer life and/or allows for wider manufacturing tolerances. A higher packing density of the hard storage disks is furthermore facilitated thereby.

To give a general idea of the dimensions, the foil between the copper tracks has a thickness of approximately 20 $\mu$m, and the copper foils are provided to a thickness of approximately 110 $\mu$m.

We claim:

1. A multiphase electric motor comprising a stationary part and movable active motor parts, the active motor parts including a motor winding for each phase and a motor magnet, an air gap being formed between said active motor parts, each motor winding built on a synthetic resin foil and formed through local removal of copper material with which the synthetic resin foil had previously been fully coated to form planar coils having individual conductor tracks mutually spaced from each other by gaps created by the local removal of the copper material with adhesive filler material filling all gaps so as to interconnect and thereby improve the stability of the tracks.

2. The multiphase electric motor as claimed in claim 1, characterized in that the adhesive filler material filling the gaps has a stability such that the individual conductor tracks of the coils are interconnected thereby again with a dimensional stability as if said gaps were still filled with the removed copper.

3. The multiphase electric motor as claimed in claim 2, characterized in that the adhesive filler material also covers upper surfaces of the planar coils with a layer of adhesive filler material.

4. The multiphase electric motor as claimed in claim 2, characterized in that a polymerizing glue is used as the adhesive filler material.

5. The multiphase electric motor as claimed in claim 2, characterized in that the adhesive filler material has been provided by silk-screen printing or roller coating.

6. Hard disk drive provided with the multiphase electric motor according to claim 1.

7. The multiphase electric motor as claimed in claim 1, wherein each motor winding is wound into an evenly rounded cylinder and is concentric with all other motor windings.

8. The hard disk drive as claimed in claim 6, wherein each motor winding is wound into an evenly rounded cylinder and is concentric with all other motor windings.

* * * * *